US009871919B1

(12) United States Patent
Stec et al.

(10) Patent No.: US 9,871,919 B1
(45) Date of Patent: *Jan. 16, 2018

(54) USER INPUT DRIVEN SHORT MESSAGE SERVICE (SMS) APPLICATIONS

(71) Applicant: West Corporation, Omaha, NE (US)

(72) Inventors: Kellan Stec, Omaha, NE (US); Geetha Gopalakrishnan, Omaha, NE (US); James K. Boutcher, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,615

(22) Filed: Jan. 24, 2017

Related U.S. Application Data

(63) Continuation of application No. 15/006,783, filed on Jan. 26, 2016, now Pat. No. 9,553,991, which is a continuation of application No. 13/973,772, filed on Aug. 22, 2013, now Pat. No. 9,247,066.

(51) Int. Cl.
H04M 3/00 (2006.01)
H04M 5/00 (2006.01)
H04M 3/523 (2006.01)
H04W 4/14 (2009.01)
H04M 3/51 (2006.01)
G06F 17/27 (2006.01)

(52) U.S. Cl.
CPC ...... *H04M 3/5183* (2013.01); *G06F 17/2705* (2013.01); *G06F 17/2785* (2013.01); *H04M 3/5166* (2013.01); *H04M 3/5233* (2013.01)

(58) Field of Classification Search
CPC ...... H04M 3/51; H04M 3/5166; H04M 3/523; H04M 3/42382
USPC ........... 379/265.09, 265.11, 265.13, 265.12, 379/265.05, 265.01, 266.01, 309, 265.02, 379/266.02; 370/252; 715/810; 455/414.1
See application file for complete search history.

(56) References Cited

U.S. PATENT DOCUMENTS 7,286,840 B2 * 10/2007 Jain ..................... H04W 88/184
455/412.1

* cited by examiner

Primary Examiner — Thjuan K Addy
(74) Attorney, Agent, or Firm — Raffi Gostanian

(57) ABSTRACT

At least one inquiry message is received from a user device in the form or a text message, email or other communication message format. The message may be received and processed to identify the content of the inquiry message to determine whether the inquiry message should be transferred to a live agent queue or whether the inquiry message should be responded to with an automated response stored in a database. In the case of the automated message failing to address the user's inquiry or if the automated responses do not appear to be relevant based on the comparison of the message content to automated response content then transmitting the inquiry message to the live agent queue.

20 Claims, 5 Drawing Sheets

USER INPUT DRIVEN SHORT MESSAGE SERVICE (SMS) APPLICATIONS

CROSS-REFERENCE TO RELATED APPLICATIONS

This application is a continuation from U.S. patent application Ser. No. 15/006,783, filed Jan. 26, 2016, entitled "USER INPUT DRIVEN SHORT MESSAGE SERVICE (SMS) APPLICATIONS", which is a continuation from U.S. patent application Ser. No. 13/973,772, filed Apr. 22, 2013, entitled "USER INPUT DRIVEN SHORT MESSAGE SERVICE (SMS) APPLICATIONS", now issued U.S. Pat. No. 9,247,066, the entire contents of each of which is incorporated by reference herein in its entirety.

TECHNICAL FIELD OF THE APPLICATION

This application relates to a method and apparatus of receiving and processing user submitted input from a user device, and more particularly, to receiving user submitted SMS messages and creating responses based on the message input content received.

BACKGROUND OF THE APPLICATION

Conventionally, a user would submit a text message or short message service type message (SMS) to a known service provider in order to receive certain feedback. SMS-based messaging and question generation are becomingly increasingly popular as it saves time for the customer, the customer support center and requires less people to answer phone calls and address user concerns. Also, in the case of interactive voice response (IVR) systems, a user may be faced with various options for pressing phone keys to be directed to the correct department or in an effort to speak with a live agent.

SUMMARY OF THE APPLICATION

One example embodiment of the present application may provide a method that include receiving at least one inquiry message from a user device, processing content of the inquiry message to determine whether the inquiry message should be transferred to a live agent queue or whether the inquiry message should be responded to with an automated response stored in a database, and transmitting the inquiry message to the live agent queue if the automated response does not satisfy the inquiry message.

Another example embodiment may provide an apparatus that includes a receiver configured to receive at least one inquiry message from a user device, a processor configured to process content of the inquiry message to determine whether the inquiry message should be transferred to a live agent queue or whether the inquiry message should be responded to with an automated response stored in a database, and a transmitter configured to transmit the inquiry message to the live agent queue if the automated response does not satisfy the inquiry message.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
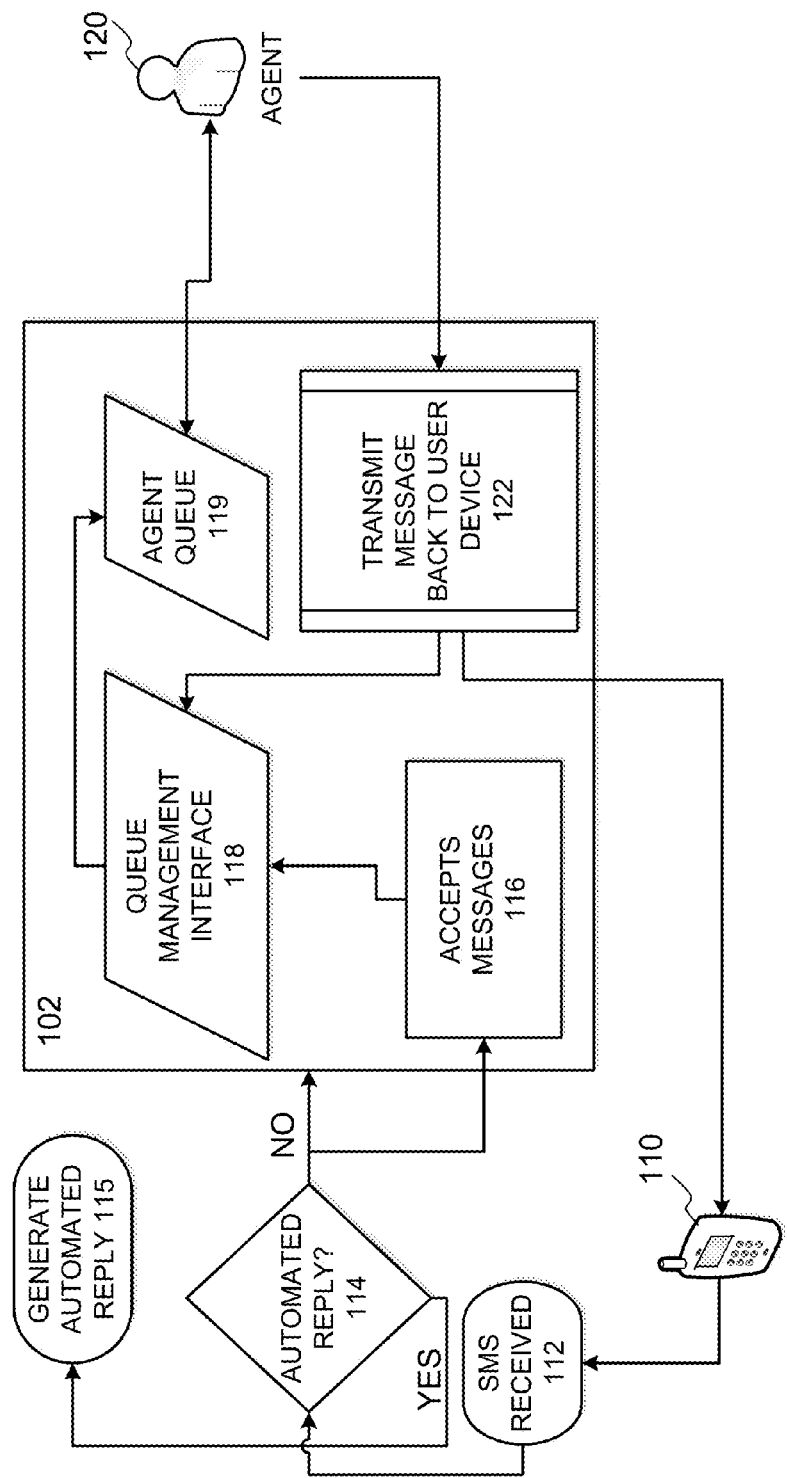
FIG. 1 illustrates a message processing logic diagram according to example embodiments of the present application.

FIG. 1 illustrates an example communication system diagram and related application system according to example embodiments. Referring to FIG. 1, the configuration 100 includes a user device 110 being used to initiate a message, such as a question, inquiry, request, etc., to a customer service message processing system. The user device may be a computer, laptop, mobile, wireless or cellular phone, a PDA, a tablet, a client a server or any device that contains a processor and/or memory, whether that processor or memory performs a function related to an embodiment of the invention.

According to one example, the message may be a SMS message with various words, symbols, images, audio, etc., or other content types used to submit an inquiry to a message processing system at a remote site. The user may be customer of a cable company or a bank or another institution that provides a service or content to the user and which requires some form of customer support feedback. The user may ask a question via a SMS message and transmit the message to a customer service support center by entering a short code or other compatible code (e.g., email, telephone number, etc.) and submitting the message and the corresponding content to the short code recipient in lieu of a reply.

According to one example, FIG. 1 illustrates a user device 110 sending a SMS message to a designated shortcode associated with the user's customer account. The SMS message may be received and processed 112 from a shortcode service provider and if the shortcode invokes an error message or is otherwise not recognized or is redirected to an automated reply service, then a reply may be generated 115 and transmitted back to the user in response to the question (s) submitted. For example, the SMS message may be received and parsed to identify each word, the word associations, if any, and the user's request purpose may all be derived from the user's message. If no automated reply is necessary and/or the SMS message is identified as being relevant or its content is identifiable, then the message may be passed to the message processing center 102 for additional message processing considerations.

If a message includes a keyword or keywords that are associated with an automated response then the words in the SMS message will be analyzed and associated with a predefined response or menu option. For instance, if the user submits a SMS message with the words "I need help with upgrades", the automated reply processing function may identify the words, "help" and identify the user's concern as being related to their account or certain common changes to a service plan as opposed to a technical question which would be identified from a message such as "the network is broken" or "the cable is down". The word "help" may invoke an agent forwarding action. The word "upgrade" may identify the purpose of the help needed and forward the user to an agent or group of agents associated with an agent queue who are all qualified to assist the user when the next agent who is part of the queue becomes available.

An automated response database or repository may include a large list of automated responses to questions to avoid having to transfer the SMS message inquiry to a live agent or agent queue. For example, the automated reply function may have an automated response to the user's question "I need help with upgrades". For instance, the cable provider may have five different cable packages ranging from basic to platinum elite. The automated response function may identify the user's request and respond by submitting an automated message stored in memory "are you aware there are presently five packages available, which were you interested in upgrading to?", the user may then continue the automated menu options by selecting options 1, 2, 3, 4 or 5 which causes another response to be generated and sent to the user until an agent is needed.

The message processing center 102 may be a server and/or a cloud-based message processing resource that readily accepts the message 116 and stores it in memory. Once it is determined that the user's questions or needs require access to a live agent, the SMS message content may be forwarded to a master queue management interface (QMI) 118, which then identifies the terms, content (e.g., audio, video, etc.), words, etc., in the SMS message and determines the type of information the customer is seeking based on the content of the message. The QMI 118 may then forward the SMS message and its content to the appropriate agent queue 119, which may then identify the appropriate agent 120 who is qualified to answer the SMS message question.

Once an appropriate agent 120 is available, the message may be forwarded to that agent assuming he or she possesses the appropriate skill set to satisfy the user's inquiry. Once the agent's attempt to answer the user's question has been received, it may be formatted in a message format similar to the user's message format, which in this case is a SMS message format. The message may be sent to a message forwarding device or engine 122, which transfers the message back to the user device 110.

Figure 2:
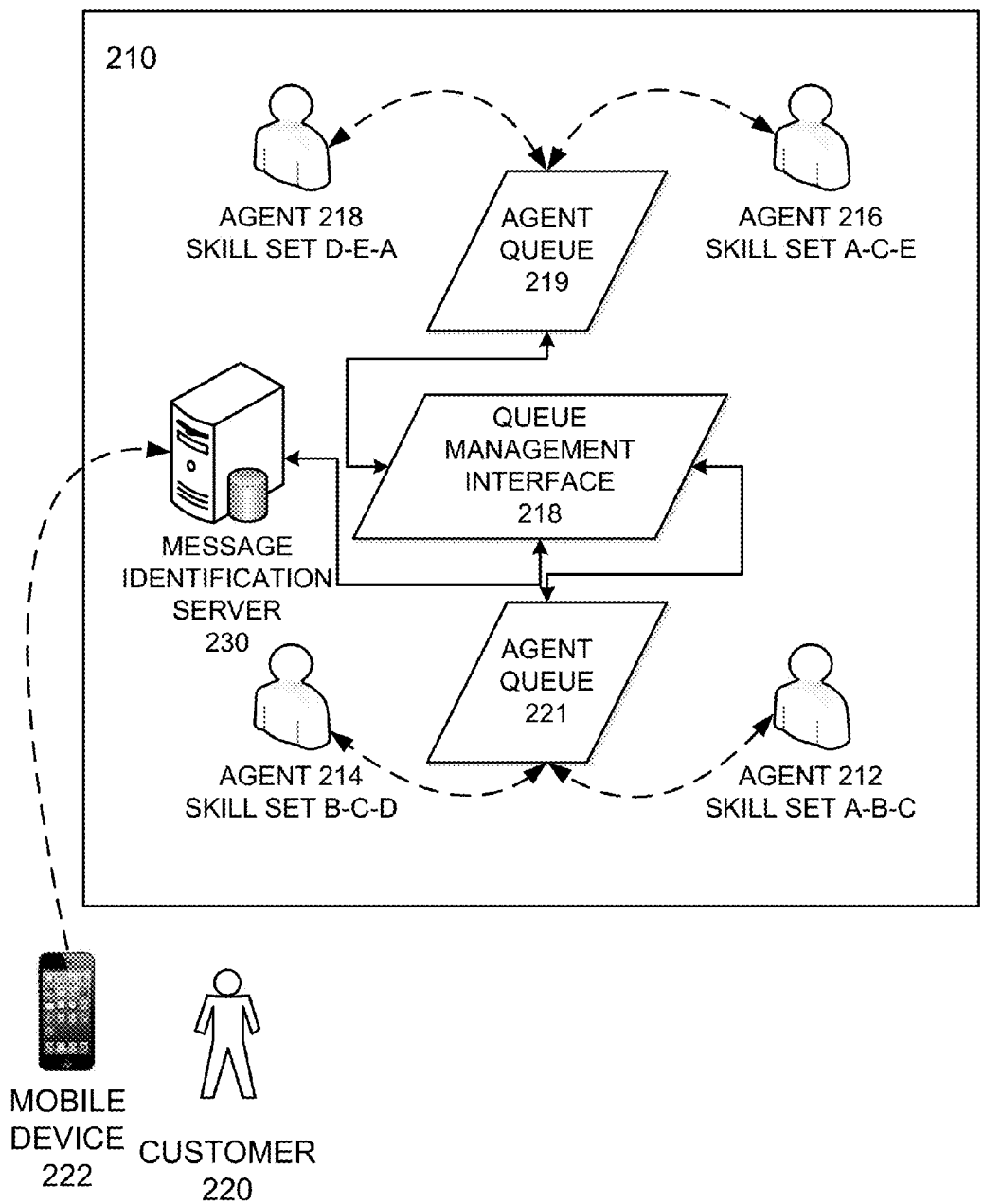
FIG. 2 illustrates the agent queue management system and the message delegation process according to example embodiments.

FIG. 2 illustrates additional details of the agent queues and the message delegation process according to example embodiments. Referring to FIG. 2, the message processing system 200 includes a message processing center 210, which may be a corporate or enterprise based processing center or a third party call processing center used to handle customer service calls, emails, SMS messages, etc., from a user.

In one example, the customer 220 may use his or her mobile device 220 to initiate a short service message (SMS) with certain content to a call processing center 210. The user may submit the SMS message to a shortcode that is known to the user as a customer support service offered by the service provider. The SMS message may be received and processed by the message identification server 230 which receives the message, identifies its purpose and whether it can be responded to by an automated response and whether or not a live agent is needed to respond to the SMS message. Once it is determined that the user's inquiry is not answerable by an automated response, the SMS message may be forwarded to the agent queue management interface 218 which then determines which agent queue to transfer the SMS message depending on various agent selection criteria.

The various agents may possess different skill sets which are stored in the queue management interface 218. For example, various different skills may be possessed by various different agents. One skill may be billing or skill set "A", another may be upgrades "B", cancellation or installation setup may be "C", transferring services to a new location "D", pay-per-view may be "E". Other types of customer service may apply to the example described throughout the specification. The cable television example described herein is only for exemplary purposes.

Continuing with the same example described above, if the user submitted SMS message pertains to upgrades based on the parsed word "upgrade" or other synonym comparison operations performed by the message identification server 230, then only agents 214 and 212 which share an agent queue 221 may be suitable agents to answer the SMS inquiry. Whereas the agent skills of agents 216 and 218 which share agent queue 219 will not be suitable agents for handling the SMS message inquiry of the present scenario. In this case, the queue management interface 218 will assign the SMS message to a memory or buffer stored in the agent queue 221 until one of the various agents associated with agent queue 221 becomes available.

Figure 3:
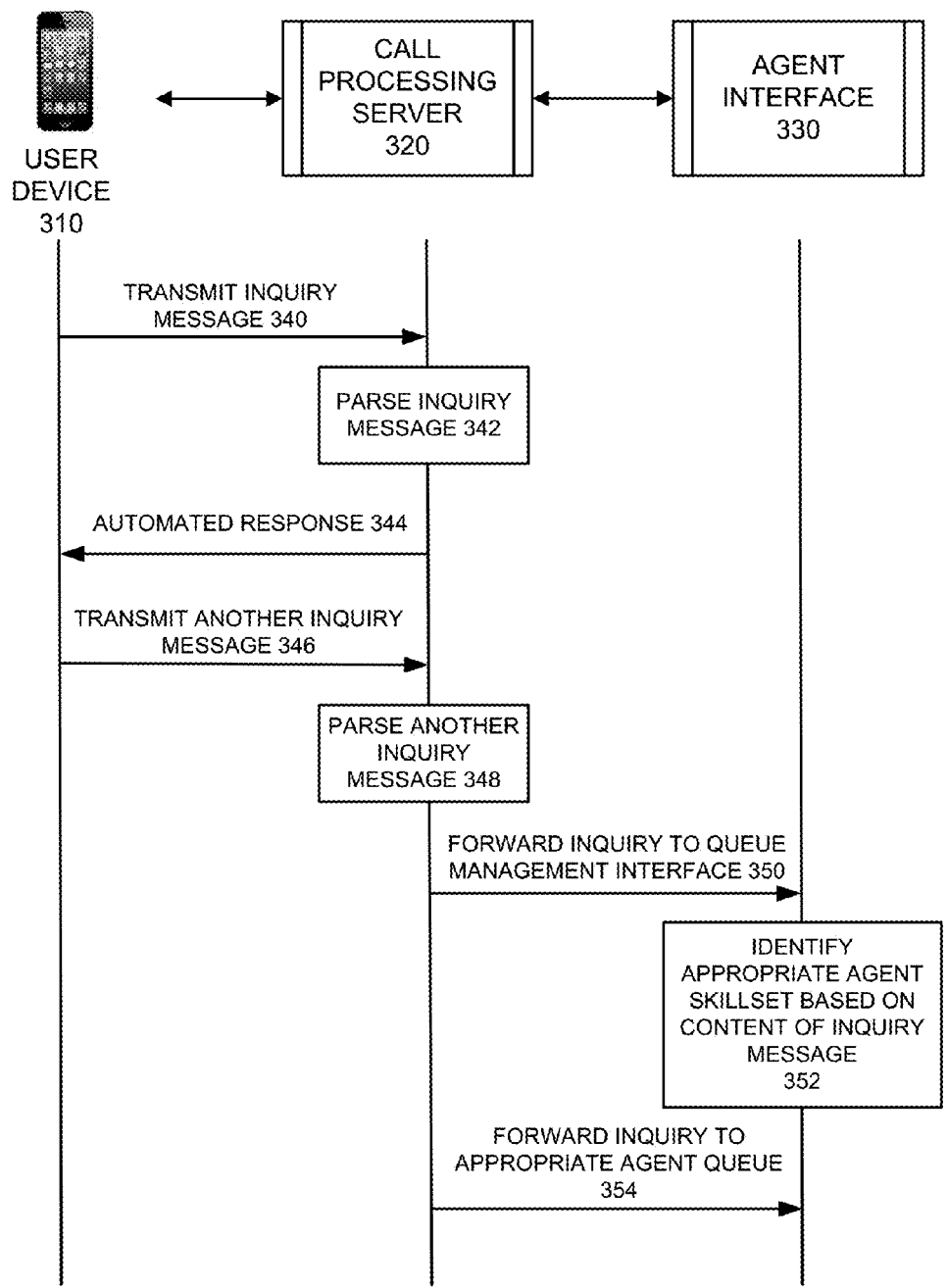
FIG. 3 illustrates an example communication flow diagram according to example embodiments of the present application.

FIG. 3 illustrates an example communication signaling diagram 300 according to example embodiments. Referring to FIG. 3, the user device 310 my initiate an inquiry message 340 to a remote call processing server 320. In response, the call server may receive and store the message and attempt to determine the user's inquiry by identifying words or other content from the SMS message and comparing the identified words to known words stored in memory. The known words may be linked to automated responses that may be generated and transmitted back to the user device. For example, the word(s) "broken", or "not working" may be identified in the SMS message. The response generator may parse those words 342 from the SMS message and identify them directly or their synonyms in a database of words. The words may be linked via a pointer or other association variable to an automated response. For example, the words "not working" may be linked to a response that offers advice for resetting the user's hardware or selection a reset option. The automated response may be sent back to the user 344.

Once the user has received the automated response, the user may decide that additional questions are required to answer the user's questions. The user device 310 may submit another SMS message 346 and the server 320 determine that no automated response will suffice. In this case, the server 320 will first parse the message 348 and determine that there are no associated words that are linked to the content of the SMS message. The server will then forward the SMS message to the queue management interface 350. The agent interface 330 will identify the content of the parsed message and will attempt to link the content of the message to a known skillset of an agent stored in memory 352. Once an agent is identified, the message will be forwarded to the agent's queue 354 who is capable of answering the user's inquiry.

Figure 4:
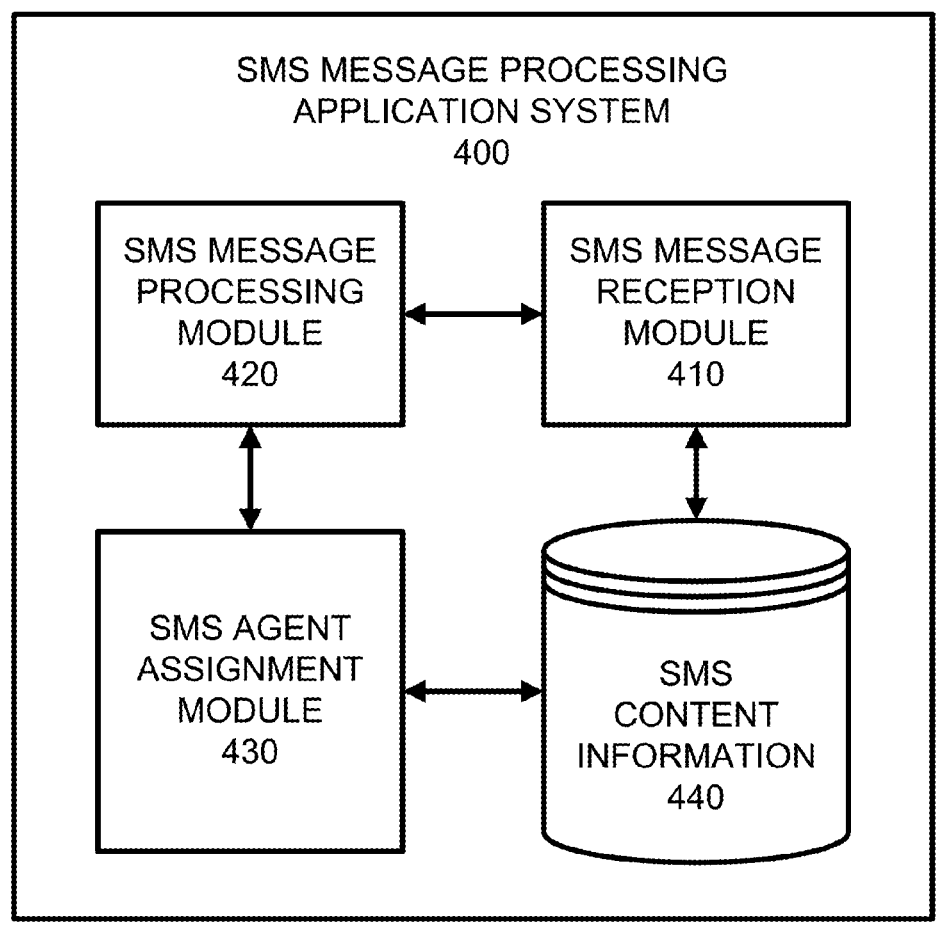
FIG. 4 illustrates a message processing system configuration that is configured to perform one or more operations corresponding to the example embodiments.

FIG. 4 illustrates an example system configuration for processing and performing one or more operations associated with the SMS message processing examples. Referring to FIG. 4, the SMS message processing application system 400 may receive at least one inquiry message from a user device at the SMS message reception module 410, and process content of the inquiry message via the SMS message processing module 420 to determine whether the inquiry message should be transferred to a live agent queue or whether the inquiry message should be responded to with an automated response stored in a database 440. The inquiry message may be transferred to the live agent queue via the SMS agent assignment module 430 if the automated responses in the database 440 do not satisfy the inquiry message.

The inquiry message may be a short message service (SMS) message that includes a plurality of words, images, videos etc. The processing of the content of the inquiry message may provide parsing at least one word from the inquiry message to determine whether an automated response should be transmitted to the user device and the word from the inquiry message may be matched to at least one keyword stored in a database. As a result, a response message may be generated to the inquiry message including the at least one keyword, and the response message may be sent to the user device to satisfy the inquiry message. The transmitting of the inquiry message to the live agent queue may also include identifying the live agent queue with at least one live agent that possesses the appropriate skill set that matches a skillset identified as being associated with the parsed keyword(s).

In another example, in response to the inquiry message an automated response message may be generated and transmitted to the user device and another inquiry message may be received and parsed to identify a purpose of the second, third or subsequent inquiry message, the application may then perform automatically transferring the new inquiry message to the live agent queue having at least one agent with a skillset associated with the purpose of the another inquiry message.

Identifying the received message content and processing an automated response may be based on responses stored in memory which are matched based on a keyword comparison that includes parsing the received message words and/or phrases prior to identifying an appropriate response. Automated responses are based on keyword and parsing matches.

Regular expressions can be processed to identify and respond with a response based on the message analysis. In another example, a Bayesian analysis probability categorizes the message as having a certain likelihood of response accuracy, however, the message is related to a category where no auto-response is available or possible.

According to one example, a client application may use a shortcode to facilitate a concierge service to their customers. In this example, reminders are transmitted via SMS to user devices that have requested a dining reservation or gift basket delivery, etc. The application permits the customer devices to schedule their reservations or deliveries through SMS but which before it was voice-only. So, the customers can transfer text messages into the shortcode, such as, for example: "Hey, I'd like to get some flowers delivered to my wife for her birthday." This message would be received at the queue and the contents would be identified, responded to with relevant subject matter and ideally the user's requests would be answered or options would be presented that are used to generate sales, options, selections, etc. Almost anything that a user would call an "800" number to receive customer support could be transmitted as a text message, and if no automated system can help then an agent could provide support if necessary. For example, the agent can say anything by typing a response into an input box on the agent's user interface, such as a web form.

Identifying the content of the message and using natural language parsing to determine the "type" of message and whether or not an automated response is available is provided by the examples in FIGS. 1-4. Generally, the end user of the user device would be submitting text messages that are uncategorized or indeterminable as far as content is concerned, and the automated application cannot properly process those messages. The pattern matching is being performed beforehand, but it is simpler in this example since the user is either opting in/out of the response queue.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components of FIG. 1, etc.

Figure 5:
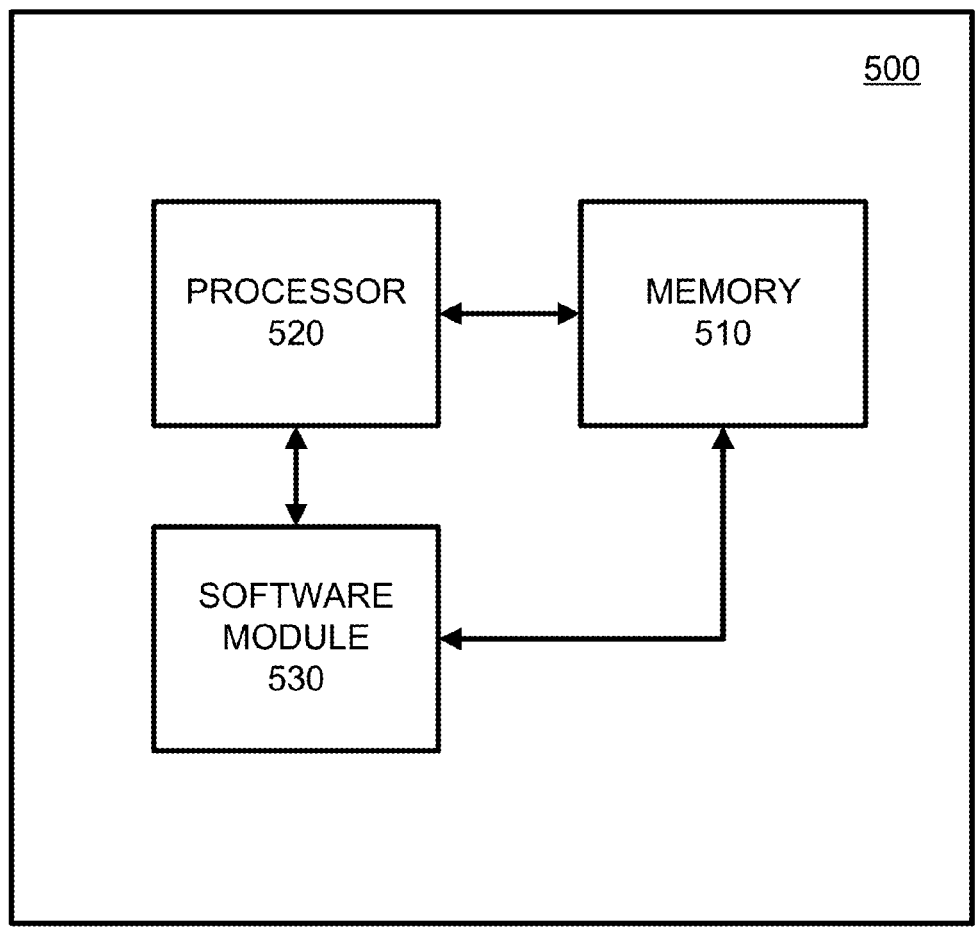
FIG. 5 illustrates an example network entity device configured to store instructions, software, and corresponding hardware for executing the same, according to example embodiments of the present application.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 4 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying a purpose of an inquiry message from at least one of a plurality of words;
   identifying the inquiry message cannot be satisfied by an automated response by determining the inquiry message cannot be paired with any words associated with the automated response; and
   transmitting the inquiry message to a live agent queue when the automated response does not satisfy the inquiry message.

2. The method of claim 1, wherein the at least one inquiry message is a short message service (SMS) message comprising the plurality of words.

3. The method of claim 1, comprising parsing the least one word from the inquiry message to determine whether an automated response should be transmitted to a user device.

4. The method of claim 3, further comprising:
   matching the at least one word from the inquiry message to at least one keyword;
   generating a response message to the inquiry message including the at least one keyword; and
   transmitting the response message to the user device to satisfy the inquiry message.

5. The method of claim 3, wherein transmitting the inquiry message to the live agent queue further comprises identifying the live agent queue with at least one live agent that possesses the appropriate skill set that matches a skillset identified as being associated with the at least one parsed keyword.

6. The method of claim 1, further comprising:
generating an automated response message;
transmitting the automated response message to a user device;
receiving another inquiry message; and
automatically transferring the another inquiry message to the live agent queue having at least one agent with a skillset associated with the purpose of the another inquiry message.

7. The method of claim 2, wherein the SMS message is transmitted to a shortcode associated with a customer service provider.

8. An apparatus, comprising:
a processor configured to:
identify a purpose of an inquiry message from at least one of a plurality of words;
identify the inquiry message cannot be satisfied by an automated response by determining the inquiry message cannot be paired with any words associated with the automated response; and
transmit the inquiry message to a live agent queue when the automated response does not satisfy the inquiry message.

9. The apparatus of claim 8, wherein the at least one inquiry message is a short message service (SMS) message comprising the plurality of words.

10. The apparatus of claim 8, wherein the least one word is parsed from the inquiry message to determine whether an automated response should be transmitted to a user device.

11. The apparatus of claim 10, wherein the processor is further configured to match the at least one word from the inquiry message to at least one keyword, generate a response message to the inquiry message including the at least one keyword, and transmit the response message to the user device to satisfy the inquiry message.

12. The apparatus of claim 11, wherein the inquiry message transmitted to the live agent queue further comprises the processor identifies the live agent queue with at least one live agent that possesses the appropriate skill set that matches a skillset identified as being associated with the at least one parsed keyword.

13. The apparatus of claim 8, wherein the processor is further configured to generate an automated response message, the transmitter is further configured to transmit the automated response message to a user device, and a receiver is further configured to receive another inquiry message, and the processor is further configured to identify a purpose of the another inquiry message, and automatically transfer the another inquiry message to the live agent queue that has at least one agent with a skillset associated with the purpose of the another inquiry message.

14. The apparatus of claim 9, wherein the SMS message is transmitted to a shortcode associated with a customer service provider.

15. A non-transitory computer readable storage medium configured to store instructions that when executed cause a processor to perform:
identifying a purpose of an inquiry message from at least one of a plurality of words;
identifying the inquiry message cannot be satisfied by an automated response by determining the inquiry message cannot be paired with any words associated with the automated response; and
transmitting the inquiry message to a live agent queue when the automated response does not satisfy the inquiry message.

16. The non-transitory computer readable storage medium of claim 15, wherein the at least one inquiry message is a short message service (SMS) message comprising the plurality of words.

17. The non-transitory computer readable storage medium of claim 15, comprising parsing the least one word from the inquiry message to determine whether an automated response should be transmitted to a user device.

18. The non-transitory computer readable storage medium of claim 17, wherein the processor is further configured to perform:
matching the at least one word from the inquiry message to at least one keyword;
generating a response message to the inquiry message including the at least one keyword; and
transmitting the response message to the user device to satisfy the inquiry message.

19. The non-transitory computer readable storage medium of claim 18, wherein transmitting the inquiry message to the live agent queue further comprises identifying the live agent queue with at least one live agent that possesses the appropriate skill set that matches a skillset identified as being associated with the at least one parsed keyword.

20. The non-transitory computer readable storage medium of claim 15, wherein the processor is further configured to perform:
generating an automated response message;
transmitting the automated response message to a user device;
receiving another inquiry message; and
automatically transferring the another inquiry message to the live agent queue having at least one agent with a skillset associated with the purpose of the another inquiry message.

* * * * *